US009347568B2

(12) United States Patent
Südel et al.

(10) Patent No.: US 9,347,568 B2
(45) Date of Patent: May 24, 2016

(54) VALVE AND DIAPHRAGM FOR A VALVE

(71) Applicant: GEA Tuchenhagen GmbH, Büchen (DE)

(72) Inventors: Matthias Südel, Ratekau (DE); Jörg Pieplow, Lübeck (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 14/401,225

(22) PCT Filed: May 3, 2013

(86) PCT No.: PCT/EP2013/001315
§ 371 (c)(1),
(2) Date: Nov. 14, 2014

(87) PCT Pub. No.: WO2013/170931
PCT Pub. Date: Nov. 21, 2013

(65) Prior Publication Data
US 2015/0129790 A1    May 14, 2015

(30) Foreign Application Priority Data

May 15, 2012    (DE) .......................... 10 2012 009 585

(51) Int. Cl.
*F16K 41/12*    (2006.01)
*F16K 1/44*    (2006.01)

(52) U.S. Cl.
CPC .. *F16K 1/44* (2013.01); *F16K 41/12* (2013.01)

(58) Field of Classification Search
CPC ..... F16K 31/122; F16K 41/103; F16K 17/16; F16K 7/16; F16K 7/00; F16K 41/12
USPC ....................... 251/331, 335.2, 324
See application file for complete search history.

(56) References Cited

U.S. PATENT DOCUMENTS

| 4,171,792 | A | 10/1979 | Bass |
| 8,616,525 | B2 | 12/2013 | Franz et al. |
| 2005/0285064 | A1 | 12/2005 | Yoshino et al. |

(Continued)

FOREIGN PATENT DOCUMENTS

| DE | 202 11 511 U1 | 12/2002 |
| DE | 10 2007 014 282 A1 | 10/2008 |

(Continued)

*Primary Examiner* — Marina Tietjen
(74) *Attorney, Agent, or Firm* — Young Basile Hanlon & MacFarlane, P.C.

(57) ABSTRACT

A valve has a valve housing with a first port and a second port, and has a closing member movable along an axial direction. When in a closed position, the closing member interacts sealingly with a valve seat to block a fluid connection between the first and second ports. An fluid-impermeable diaphragm comprises a central opening through which a closing member arrangement including the closing member extends, and a clamping section that runs in a clamping gap. The diaphragm is held with sealing action between the closing member arrangement and a holding arrangement on the housing. The diaphragm has a first section and a second section adjoining the first section. The first section is held in the holding arrangement with a force fit, the second section is guided in the holding arrangement, and the first and second sections are arranged at an angle relative to one another. A form fit is generated by the first section, second section and holding arrangement.

17 Claims, 6 Drawing Sheets

(56) References Cited

U.S. PATENT DOCUMENTS

2006/0151737 A1* 7/2006 Newberg ............... F16K 27/07
   251/335.2
2007/0120086 A1  5/2007 Yoshino et al.
2011/0156352 A1* 6/2011 Bond ..................... F16J 15/064
   277/312

FOREIGN PATENT DOCUMENTS

| EP | 1 553 473 A1 | 7/2005 |
| EP | 1 953 436 A2 | 8/2008 |
| GB | 2 224 335 A  | 5/1990 |

\* cited by examiner

VALVE AND DIAPHRAGM FOR A VALVE

TECHNICAL FIELD

The invention relates to a valve and a diaphragm for a valve, particularly for use in the food or processing industry.

BACKGROUND

Valves are important components in processing systems by means of which flows of product media are directed through piping systems in the product-conducting system. The directing effect is based on the switching function of the valves.

A valve has a valve housing having at least one first port and one second port. In the valve of a generic type, a closing member arrangement with a closing member is provided that is movable along an axial direction. Associated with this axial mobility, the valve can be brought into a closed position in which it interacts sealingly with a valve seat arranged between the ports whereby a fluid connection between the first and second ports is blocked. The axial movement of the closing member can be instigated outside of the valve housing. Generally, a pressurizing medium-operated drive is used in which the pressurizing medium exerts pressure on a piston against the restoring force of a spring.

Particular demands are placed on the valve in aseptic applications such as in the food industry. In such applications, the contact of the product with the surrounding air is to be avoided since bacteria and germs can otherwise be introduced into the product. The design of the seal in the valve is correspondingly complex. Sealing the closing member arrangement against the surroundings of the housing is important, particularly where the closing member arrangement is connected to the drive.

DE 102007014282 A1 proposes a fluid-impermeable diaphragm that is held, on the one hand, with a sealing effect on the closing member arrangement and, on the other hand, on a valve-housing-side holding arrangement. The holding arrangement has a clamping gap aligned obliquely to the axial direction. The diaphragm comprises a clamping section running within this clamping gap and a central opening which the closing member arrangement penetrates. The sealing effect results from the central opening being held on the closing member arrangement and the clamping section being held in the clamping gap. In contrast to known materials based on elastomers, this diaphragm is produced from a dimensionally-stable plastic that is heat-resistant up to at least approximately 130° C. This yields constant dimensions under operating conditions, especially operating pressure and operating temperature. Along with clamping the diaphragm in the clamping gap, a high storage stability and an overall effective seal result.

DE 102007014282 A1 teaches further improving the seal by providing a projection in the clamping gap that increases the clamping force.

BRIEF SUMMARY

The object of the invention is to create a valve with a diaphragm, and to create a diaphragm, that further improve the valve-housing-side seal of the diaphragm compared to the prior art and thereby reduce the need for maintenance.

This object is solved by a valve and a diaphragm described herein. Advantageous developments whose noted effects enhance the overall advantages are also described.

The diaphragm according to the invention has a first section that is arranged on a radial outer edge of the diaphragm, and that is abutted radially inward by a second section. Both sections are offset at an angle from each other. The first section is clamped in the holding arrangement of the diaphragm, and the second section is contrastingly at least guided. The angle between the sections is dimensioned such that a form fit results between the holding arrangement and the sections. The sections of the diaphragm and the angle between them can be preformed, preferably close to the angle that is formed in the holding arrangement. By clamping the first section, the clamping forces that bring about the positioning of the diaphragm are increased overall, and larger surface sections of the diaphragm are fixed by clamping such that, in cooperation, slippage of the diaphragm within the clamping gap is strongly reduced. The form fit significantly reinforces this effect such that the diaphragm remains stationary under all operating conditions in the holding arrangement from the interaction of the clamping gap, form fit and force fit with the first section. By means of the force fit, the outer edge of the diaphragm is also sealed quite well against the first section and holding arrangement, and better than the prior art. This is particularly advantageous and reduces the need for maintenance since the inventors found that product is drawn into the holding arrangement, particularly the clamping gap, by the movement of the diaphragm and the holding arrangement, particularly in the clamping gap. This contamination can result on the one hand from the product chamber within the valve and on the other hand from the surroundings of the housing. This is reliably prevented by the design of the diaphragm and valve according to the invention.

In a development of the valve, the angle between the first and second section is between 60° and 135°. This produces a reliable form fit and minimizes the stress on the material from deformation when manufacturing the diaphragm or when installing a differently-shaped diaphragm in the holding arrangement.

In another development, it is proposed to arrange the first section in a plane approximately perpendicular to the axial direction. If the diaphragm thereby extends substantially flat radially to the outside in the first section, also while tolerating a few angular degrees of deviation, an economical design with easily adjustable clamping forces results.

Another development provides shaping the second section substantially cylindrically with a cylinder axis, wherein the cylinder axis is oriented in an axial direction. Deviations are included within the context of production accuracies and a few angular degrees of deviation. This yields a holding arrangement that is economical to produce with favorable guide properties for the second section.

The invention can be developed with at least one passage in the diaphragm between the clamping section and first section, wherein the passage interacts with a channel formed in the valve-housing-side holding arrangement. This passage can be designed in the form of a plurality of passage openings arranged distributed over the perimeter that are connected to each other so as to be permeable to fluid, for example by means of a ring-shaped groove in the valve housing and/or in the second housing part. By means of this measure, any material entering the holding arrangement, such as the clamping section, from the valve interior becomes visible by being conducted through the passage in the diaphragm to the outside.

In another development, the holding arrangement is provided with a first and second gap, wherein the first gap forms a force fit with the first section of the diaphragm, and the second gap guides the second section. With this design of the holding arrangement, the aforementioned advantages can be economically achieved. In addition, the material stress on the diaphragm can be especially minimized.

Another development relates to the design of the first gap and provides limiting this gap with a first and second wall, wherein at least one of the walls has a structure that increases the friction of the diaphragm in the gap. The structure can be, for example, a groove, a projection, waviness, etc. In this manner, the diaphragm is further held in its position by increased frictional locking or interlocking of the diaphragm and gap extending into the form fit, and the seal is increased.

A subsequent development relates to the design of the first clamping gap and provides limiting this clamping gap with a first and second clamping gap wall, wherein at least one of the walls has a structure that increases the friction of the diaphragm in the clamping gap. The structure can be, for example, a groove, a projection, waviness, etc. In this manner, the diaphragm is further held in its position by increased frictional locking or interlocking of the diaphragm and clamping gap extending into the form fit, and the seal is increased.

In an advantageously economical development, a pressurizing medium-operated drive, such as a pneumatic drive, is provided that is connected to the closing member arrangement in order to bring about the movement of the closing member along the axial direction.

In conjunction with a pressurizing medium-operated drive, a further development proposes providing a rotary decoupling apparatus in the drive, or between the drive and the closing member arrangement. Pressurizing medium-operated drives frequently generate torsional force by a helical spring. The transmission of the torsional force to the diaphragm is prevented by means of the rotary decoupling apparatus so that the life of the diaphragm is extended by eliminating the stress from torsion.

According to another development, an economical design of the rotary decoupling is proposed. According to the above, the rotary decoupling apparatus is arranged between the drive and closing member arrangement and comprises a first decoupling member in a cylindrical seat in which a cylindrical projection of a second decoupling member is accommodated.

With another development, advantageous relief of the diaphragm is achieved that significantly reduces damage and associated possibilities for transmitting germs, and increases the life of the diaphragm. According to the above, a first support surface is provided on the housing side, and a second support surface is provided for the diaphragm on the closing member arrangement. By placing at least a section of the diaphragm on one of the support surfaces, the pressure and hence the traction that is exerted on the part of the diaphragm located in the holding arrangement is reduced. This placement promotes a shift in the diaphragm in the holding arrangement.

According to a development of the arrangement with support surfaces, the diaphragm lies on one of the support surfaces in each case in an open position of the closing member in which a fluid connection is created between a first port and second port, wherein at least 50% of the overall diaphragm surface is supported. Supporting this surface section of the diaphragm has proven to be particularly advantageous in increasing the aforementioned advantages in regard to cleanliness and life.

An additional development relates to the material of the diaphragm and provides that the diaphragm has a compressibility of at least 20% according to the standard ASTM F36 "Standard Test Method for Compressibility and Recovery of Gasket Materials" in the 2009 version. It was found that permanent dimensional stability is achieved in this manner that supports the form fit for a long time and increases the clamping forces and sealing effect.

A diaphragm for a valve, particularly for the food or processing industry, comprises a valve housing, a closing member arrangement, a valve-housing-side holding arrangement for holding the diaphragm and a clamping gap for the diaphragm running obliquely to an axial direction. The diaphragm has a conical section suitable for being accommodated in the clamping gap and a central opening through which the closing member arrangement can penetrate. Such a diaphragm achieves the cited advantages for the valve according to the invention. This is developed in that a first section is provided on a radial outer edge of the diaphragm against which a second section abuts radially to the inside that is at an angle to the first section. The diaphragm is dimensioned such that the first section and second section can be accommodated in the holding arrangement while forming a form fit. This type of shaping that is created in the diaphragm production process before installation in a valve reduces the load on the diaphragm in an installed state since deformation occurs during the production process instead of permanent deformation. This prevents a constant, strong load, the life is extended, and the seal and cleanliness are improved.

In a development of the diaphragm, the angle between the first and second sections is between 60° and 135°. This type of deformation during production creates an effective form fit after installation in a valve and advantageously minimizes the material stress from deformation during installation in a holding arrangement in the valve.

Another development of the diaphragm provides at least one passage in the second section such that the passage is positioned between clamping points of the holding arrangement. This advantageously causes any material that nonetheless enters the holding arrangement to pass through the passage and thereby become visible.

A further development of the diaphragm provides that the diaphragm comprises a material with a compressibility of at least 20% according to ASTM F36. It was found that permanent dimensional stability is achieved in this manner that supports the form fit for a long time and increases the clamping forces and sealing effect.

The invention will be further explained, and details of the effects and advantages will be described with reference to an exemplary embodiment and its developments.

DETAILED DESCRIPTION

Figure 1:
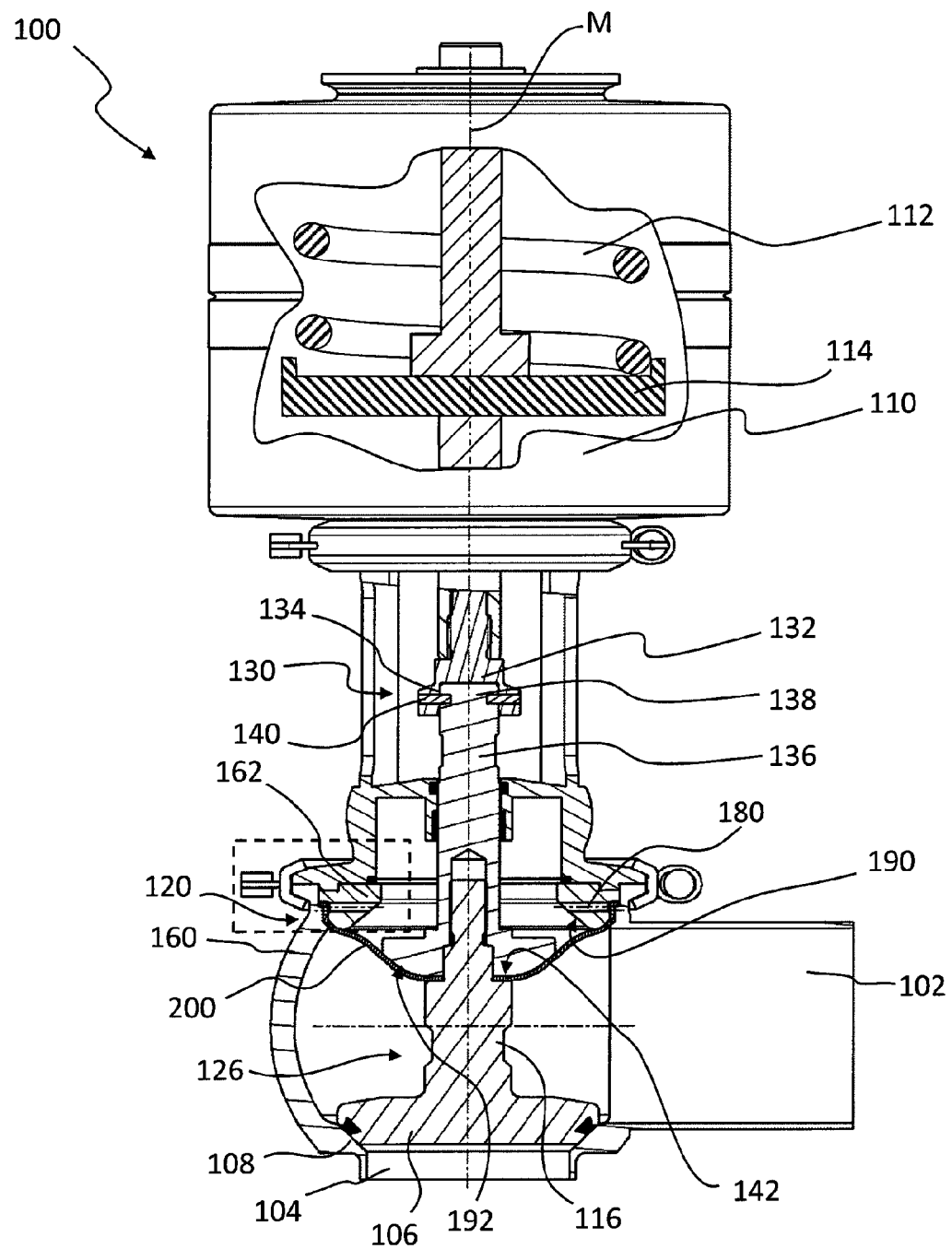
FIG. 1 shows a longitudinal section of a valve and schematic partial section of a drive coupled to the valve.

A valve 100 is depicted in a partial longitudinal sectional view in FIG. 1. It has a first port 102 and a second port 104 that can be connected with pipes, such as a food industry processing system. Within a valve housing 160, a closing member 106 is provided that can be brought into sealing contact with a valve seat 108 that is arranged between the first and second ports 102 and 104. A closed position is created by this contact of the valve seat 108 and closing member 106. The sealing effect prevents a fluid connection and hence prevents product flow between the first and second ports 102 and 104. When the valve 100 is in an open position, the closing member 106 and valve seat 108 are separate from each other so that the fluid connection is established between the first and second ports 102 and 104, and product can flow between the two ports 102 and 104.

The movement of the closing member 106 from the open position to the closed position and vice versa is caused by a drive 110. In the example, this is done under the operation of a pressurizing medium. A pressurizing medium moves a piston 114 against the force of a spring 112 that causes a resetting of the piston 114. The piston 114 is coupled by a suitable means, such as a valve rod, to the closing member 106. The direction of movement of the closing member 106 establishes an axial direction M. According to FIG. 1, the piston 114 is moved along the axial direction M by the application of pressurizing medium such that the open position is reached. The spring 112 contrastingly brings about the closed position.

The mode of action of the drive 110 can also be designed in reverse such that the closing member 106 is held in an open position by the force of the spring 112, and the closed position is brought about by applying pressure.

The spring 112 for generating the opposing force can interact with a second actuator. This can be designed as the application of pressurizing medium to the piston 114, which generates a force acting in the direction of the spring 112. In this manner, the closing member 106 can be brought into positions in an axial direction with the assistance of the drive 110 that are between the closed position and open position, hence producing intermediate positions of the closing member 106.

The valve 100 comprises a fluid-impermeable diaphragm 200 that is arranged and designed to prevent product entering the valve housing 160 through one of the ports 102 and 104 from contacting the surroundings of the valve 100 in the area of a closing member arrangement 126 guided through the valve housing 160. The closing member arrangement 126 comprising the closing member 106 penetrates the diaphragm 200 impermeable to product and is held sealed on the closing member arrangement 126 and in a holding arrangement 120 on the valve housing side.

To achieve a simple design that can be quickly assembled, the closing member arrangement 126 comprises a plurality of parts connectable to each other such as the closing member 106, an optional spacer 116 and a second decoupling member 136. At the connecting point between the spacer 116 or closing member 106 and the decoupling member 136, a clamping area 142 can be provided in which the diaphragm 200 is clamped between the closing member 106 and the second decoupling member 136. The clamping effect is calibrated to achieve a sealing effect against product from passing through.

In one development, it is advantageous to calibrate the clamping effect so that the diaphragm 200 does not execute a movement within the clamping area 142 that is noticeable by product being entrained into the clamping area 142 when the closing member 106 moves from the open position into the closed position.

The closing member arrangement 126 can comprise a second support surface 192 on which the diaphragm 200 lies in at least one position of the closing member 106. Such a support of the diaphragm 200 reduces the load from active force that, for example, is generated by fluid under pressure, and thereby increases the life of the diaphragm 200.

The e.g. helically-designed spring 112 of the drive 110 generates torque that, when the drive 110 is directly connected to the closing member arrangement 126, is transmitted to the closing member arrangement 126 and the closing member 106. Because the diaphragm 200 is held on the closing member arrangement 126, the torque is also transmitted to the diaphragm 200. Additional deformation and stress on the diaphragm 200 arise from the introduced torque and the housing-side holder, which therefore reduces the life of the diaphragm 200. In addition, by introducing force into the holders, the seal at that location is stressed.

It is therefore an advantageous development to provide a rotary decoupling apparatus 130 between the attachment point of the diaphragm 200 on the closing member arrangement 126 and the drive 110. The rotary decoupling apparatus 130 prevents torque from being introduced into the diaphragm 200 by the drive 110. This accordingly increases the life and reduces the stress on the seal.

The rotary decoupling apparatus 130 comprises, for example, a first decoupling member 132 that is connected to the drive 110. The first decoupling member 132 has a cylindrical seat 134 in which a cylindrical projection 138 of the second decoupling member 136 enters that is part of the closing member arrangement 126.

A locking member 140 is designed so that it permits the rotation of the first decoupling member 132 relative to the second decoupling member 136, whereas an axial movement of the decoupling members 132 and 136 relative to each other is suppressed.

The locking member 140 can for example be formed as follows. The cylindrical projection 138 has a peripheral groove. A lock engages therein which is designed to prevent an axial movement of the cylindrical projection 138 relative to the cylindrical seat 134. The lock can be moved relative to, and in the peripheral direction of, the groove to enable the rotation of the members. An essentially U-shaped disc with a thickness that basically corresponds to the width of the groove is an example of such a design. The advantage of a locking member 140 designed in this manner is the very low wear bordering on a lack of wear.

The valve-housing-side holding arrangement 120 comprises the valve housing 160 and a second housing part 162 that together hold the diaphragm 200. The holding arrangement 120 can advantageously comprise a first support surface 190 and a channel 180.

Figure 2:
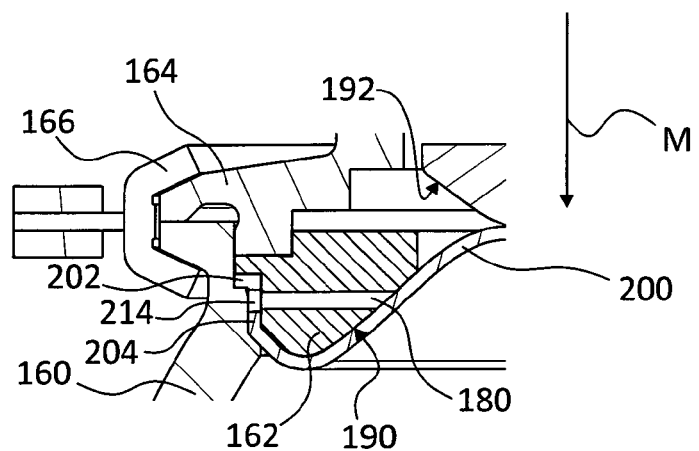
FIG. 2 shows a detailed view of the area of the valve framed with a dashed line in FIG. 1.

The design and function as well as developments of the holding arrangement 120 will be further explained below with reference to FIG. 2 and FIG. 3.

The holding arrangement 120 of the exemplary embodiment comprises a suitably shaped part of the valve housing 160 and the second housing part 162. Both have contours that are shaped complementary to each other, at least in tiers, between which gaps arise. Sections of the diaphragm 200, in particular a first section 202 and second section 204, are arranged in the gaps when the valve 100 is in an installed state.

The contour located on the valve housing 160 is arranged on an opening of the housing, and surrounds this opening. The opening is closed with a cover 164 to which the drive 110 is directly or indirectly connected. At least one of the components that create a connection between the closing member 106 and the drive 110, such as the second decoupling member 136, penetrates the cover 164.

The cover 164 contacts the second housing part 162 and is fixed to the valve housing 160 by means of a connecting member. The connecting member can be a screwed connection and is designed as a clamp 166 in the portrayed example. The cover 164 and the second housing part 162 are clamped against each other in the axial direction M by the clamp 166. A force is exerted thereby on the second housing part 162 so that the clamping of the diaphragm 200 between the valve housing 160 and the second housing part 162 arises by means of an indirect force.

The channel 180 noted as an advantageous development with reference to FIG. 1 can be formed in the second housing part 162, for example radially inward in the direction of the second decoupling member 136, and can interact with a passage 214 in the diaphragm 200. If product enters the gap between the diaphragm 200 and valve housing 160, it can be removed through the passage 214 and channel 180 out of the area between the valve housing 160 and the second housing part 162.

Figure 3:
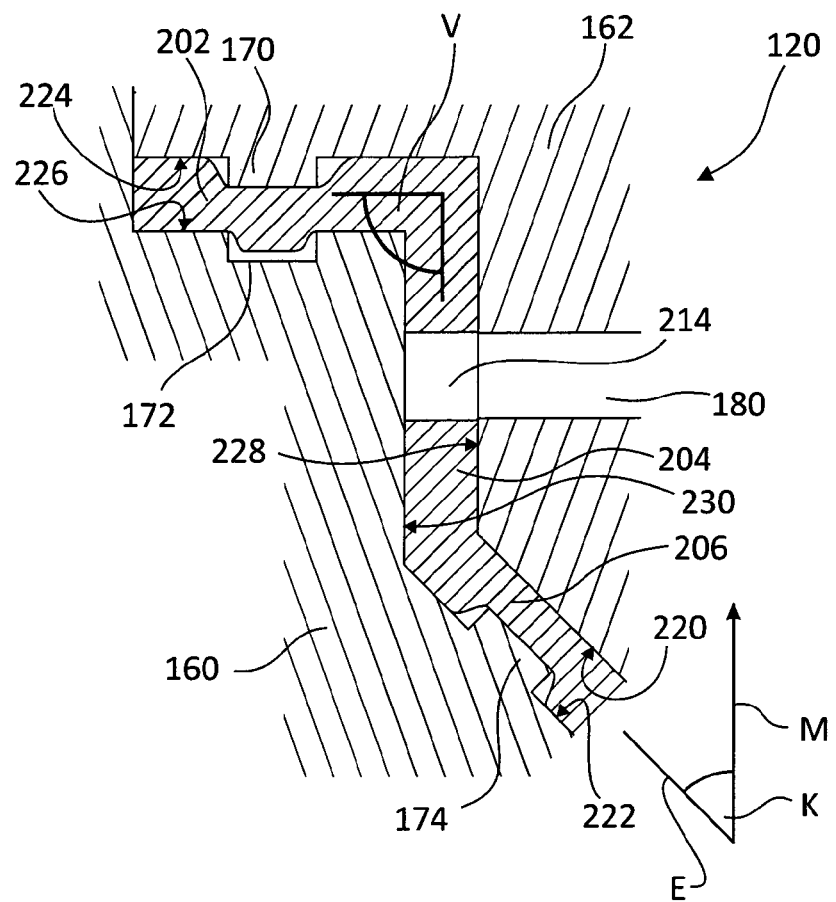
FIG. 3 shows a schematic sectional representation of the holding arrangement that holds the diaphragm on the housing side.

The contours are formed by walls as can be better seen in the detailed view in FIG. 3.

The contour of the second housing part 162 is formed by a first clamping gap wall 220, a first guide wall 228, and a first wall 224 that are adjacent to each other and are at different angles relative to each other.

The contour of the valve housing 160 is in turn formed by a second clamping gap wall 222, a second guide wall 230, and a second wall 226 that also are adjacent to each other and are at different angles relative to each other.

The first clamping gap wall 220 and the second clamping gap wall 222 are arranged as a pair and border a clamping gap in which a clamping section 206 of the diaphragm 200 is clamped. The clamp is designed to effect a seal between the clamping section 206 and the second clamping gap wall 222 in addition to the local fixation. In the cross section, the clamping gap has a direction of extension E that is aligned at an angle K relative to the axial direction M. This angle K can preferably range between 30° and 60°, and is preferably 45°. This reduces the stress on the diaphragm 200.

The first section 202 of the diaphragm 200 is located in a first gap formed between the first wall 224 and the second wall 226. The arrangement is dimensioned so that the force indirectly exerted on the second housing part 162 causes the first section 202 to be clamped between the first wall 224 and the second wall 226.

The second section 204 of the diaphragm 200 is located in a second gap formed between the first guide wall 228 and the second guide wall 230. Clamping can be realized; however, the second section 204 is at least guided by the walls 228 and 230.

An arrangement of the first section 202 and the second section 204 at an angle V relative to each other results from the alignment of the walls 224, 226, 228 and 230. This angle V is dimensioned so that a form fit is formed by the first section 202, the second section 204 and the walls 224, 226, 228 and 230. The diaphragm 200 is held in this manner in a form fit in the holding arrangement 120.

This form fit prevents movement of the diaphragm 200 even when the forces acting on it are able to overcome the friction between the diaphragm 200 and the valve housing 160, in particular between the sections 202, 204 and 206 of the diaphragm 200 and the walls 220, 222, 224, 226, 228 and 230.

There are a few advantageous design options for the alignment of the walls 224, 226, 228 and 230 with reference to the axial direction M and the choice of the angle V, which can be selected individually or in combination.

The walls 224, 226, 228 and 230 can be shaped so that the angle V between the first section 202 and the second section 204 is between 60° and 135°. This produces a reliable form fit and simultaneously minimizes the stress on the material from deformation when manufacturing the diaphragm 200 or when installing a differently-shaped diaphragm 200 in the holding arrangement 120.

According to a subsequent design option, the first section 202 is arranged in a plane approximately perpendicular to the axial direction M. If the diaphragm 200 thereby extends substantially flat radially to the outside in the first section 202, also while tolerating a few angular degrees of deviation, it yields an economical design with easily adjustable clamping forces.

The next design option provides shaping the second section 204 substantially cylindrical with a cylinder axis, the cylinder axis being oriented in the axial direction M, wherein deviations are included within the context of production accuracies and a few angular degrees of deviation. This yields a holding arrangement 120 that is economical to produce with favourable guide properties for the second section 204.

According to one development, the passage 214 can be advantageously provided in the second section 204 and hence between two clamped sections (first section 202 and clamping section 206) of the diaphragm 200. This not only allows product leakage to be identified, it also allows the problem area to be restricted before the seal and the holder of the diaphragm 200 have completely failed.

The fixation of the diaphragm 200 can be improved by the following measures. A first elevation 170 can be provided on the first wall 224 that is pressed in while being installed in the first section 202 of the diaphragm 200. Alternatively or in addition, a groove 172 can be provided on the second wall 226 in which the first section 202 is formed under the effect of clamping force. Also, only one groove can be provided in the first wall 224. At least one groove or a projection can also be provided in the clamping gap on one of the clamping gap walls 220 and 222, for example a second elevation 174 on the second clamping gap wall 222.

With the assistance of a groove or elevation, the number and dimensions of which are established in consideration of the material of the diaphragm 200, structures are created that increase the friction of the diaphragm 200 in the gap formed by the respective pairing of the walls 220, 222, 224, 225, 228 and 230. In this manner, the diaphragm 200 is further held in its position by increased frictional locking or "interlocking" of the diaphragm 200 and the gap extending into the form fit. The seal is increased.

Figure 4:
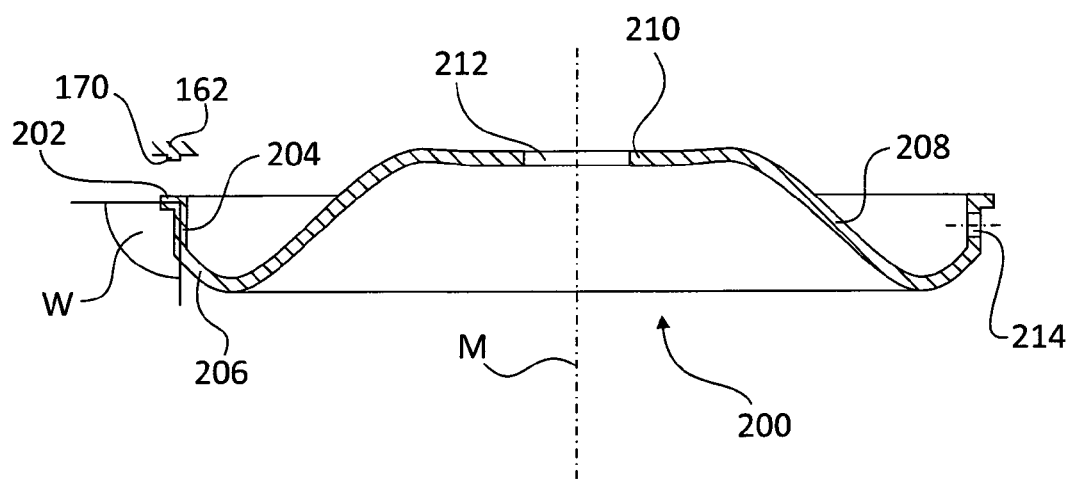
FIG. 4 shows a section of the diaphragm along the longitudinal axis.

In FIG. 4, the diaphragm 200 is depicted as a preformed component. Preformed means that the individual sections are formed by permanently shaping the diaphragm blank before installation in the valve 100. The material of the diaphragm 200 is selected so that deformation of the diaphragm 200 is possible by moving the closing member during the operation of the valve 100.

The diaphragm 200 in the depicted example has a plurality of radially neighboring sections.

The first section 202 is provided on the edge lying radially to the outside. It can be formed basically extending in a plane perpendicular to the axial direction M. The second section 204 abuts the first section 202 radially within the first section 202. This can be shaped substantially cylindrical with a cylinder axis, the cylinder axis being oriented in the axial direction M, wherein deviations are included within the scope of production accuracies and a few angular degrees of deviation.

The first section 202 and the second section 204 are arranged oriented at an angle W relative to each other that is always different from 180° and preferably lies within a range between 60° and 135°. It can be 90° to simplify production which includes a few angular degrees of deviation. This preformed angle W can deviate from the angle V of the holding arrangement 120. Particularly easy and reliable installation is achieved when the angles W and V are close within a few angular degrees, for example, within a deviation of less than 10°. This also reduces the material stress arising from deformation during installation.

A third section abuts the second section 204 radially inward that corresponds to the clamping section 206. This approximately forms a cone and is hence shaped so that it can be clamped between the first clamping gap wall 220 of the second housing part 162 and the second clamping gap wall 222 of the valve housing 160.

A fourth section 208 follows the clamping section 206 radially inward. In this section, the contour of the diaphragm 200 is subject to the greatest changes when the closing member 106 is moved by the drive 110. In addition, forces act on the fourth section 208 when the product is under pressure. To reduce the stress from such forces, the fourth section 208 is preformed so that it interacts with the support surfaces 190 and 192 when the valve 100 is in an open or closed position. This will be explained further with reference to FIGS. 5 and 6.

A fifth section 210 abuts the fourth section 208 radially inward and extends in a plane that is substantially perpendicular to the axial direction M. The fifth section 210 surrounds a central opening 212 through which the second decoupling member 136 or a component associated therewith can be guided. In this manner, the fifth section 210 is designed to be clampable on the closing member arrangement 126, preferably in an axial direction M. This effects fixation and, on the other hand, a seal.

Preferably, a material with high dimensional stability and a temperature resistance of at least 130° C. is used for the diaphragm 200. Given the dimensional stability, it is possible to dispense with support means such as support diaphragms connected to the diaphragm 200. Preferably, the material has a high media resistance. In particular, it should have little creep, preferably a compressibility of at least 20%, preferably 25%, and advantageously more than 30% according to ASTM F36. It can for example be a compound of a plurality of layers containing polytetrafluoroethylene (PTFE), wherein at least one of the layers contains a filler such as silicon oxide.

Figure 5:
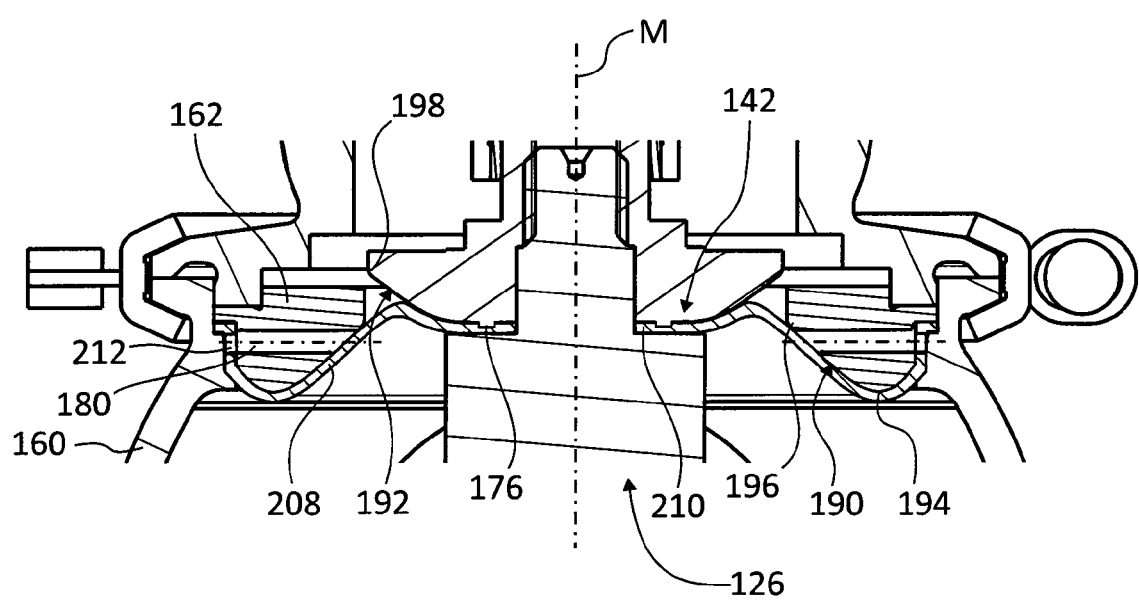
FIG. 5 shows a section of the valve in the area of the diaphragm when the closing member arrangement is in an open position.
Figure 6:
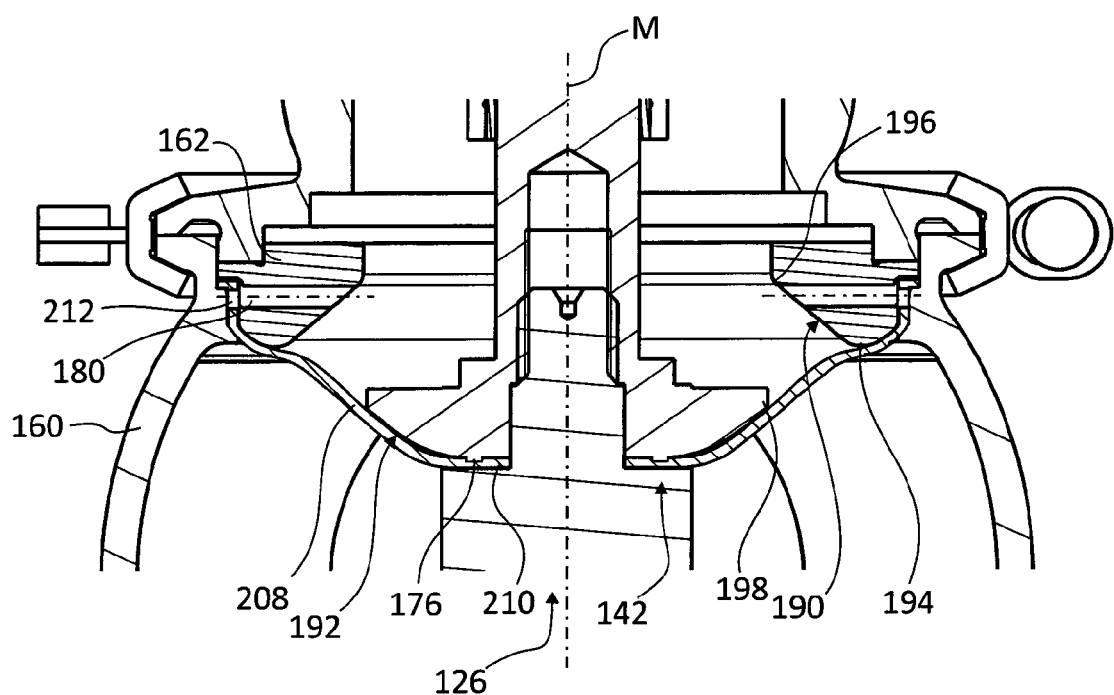
FIG. 6 shows a section of the valve in the area of the diaphragm when the closing member arrangement is in a closed position.

FIG. 5 and FIG. 6 serve to illustrate the deformation of the diaphragm 200 during the operation of the valve 100, and serve as a basis for explaining the advantageous support surfaces 190 and 192.

The open position of the valve 100 in which the closing member 106 is lifted off of the valve seat 108 and hence is at a distance to create a fluid connection between the ports 102 and 104 is depicted in FIG. 5. The closed position with the interrupted fluid connection is shown in FIG. 6.

In the open position according to FIG. 5, the closing member arrangement 126 is shifted in the axial direction M toward the drive 110. Part of the extension of the fourth section 208 of the diaphragm 200 lies on the first support surface 190 of the second housing part 162. The first support surface 190 has an extremum 194 that the fourth section 208 also abuts, and it transitions from there continuously without kinks and discontinuities into the clamping section 206. The first support surface 190 and hence the support terminates radially to the inside in a first edge 196 that advantageously has a rounded shape. The first edge 196 and the extremum 194 and hence the area of the first support surface 190 can be dimensioned such that at least 50% of the diaphragm surface of at least one of the support surfaces 190 and 192, or the sum of the support surfaces 190 and 192, is supported in the open position.

In the closed position according to FIG. 6, the fourth section 208 of the diaphragm 200 lies on the first support surface 190 extending up to a second edge 198 on the closing member arrangement 126. The fourth section 208 abuts the extremum 194 on the valve housing side. The position of the second edge 198 and the extremum 194 can be dimensioned such that at least 50% of the diaphragm surface is supported by at least one of the support surfaces 190 and 192, or the sum of the support surfaces 190 and 192, in this position as well.

Since the diaphragm 200 rests on the extremum 194 in both positions of the closing member arrangement 126, the influence of the deformation on the third section 206 clamped in the clamping gap is kept as small as possible. In particular, forces on the diaphragm 200 directed perpendicularly to the path of the clamping gap are avoided since the diaphragm 200 runs largely without a change in direction at the free end of the clamping gap.

FIG. 5 and FIG. 6 show an advantageous embodiment of the holder of the diaphragm 200 on the closing member arrangement 126. The fifth section 210 of the diaphragm 200 is clamped in the clamping area 142 between two components of the closing member arrangement 126. This clamping can basically be realized in a plane perpendicular to the axial direction M. Together with the second support surface 192 that is curved and, toward the middle, is designed to transition into the clamping plane, a small load on the fifth section 210 results when the closing member arrangement 126 moves. The holder and seal can be additionally improved with a peripheral projection 176 that is provided on the closing member arrangement 126 and is pressed into the fifth section 210 of the diaphragm 200.

The invention was presented with reference to a single-seated valve but is however not restricted to use within this valve type. The invention can also be usefully applied in valves that have several seals on the closing member, so-called double-seal valves, or in switching valves, as well as double-seat valves with a plurality of closing members in order to seal the closing member against the valve housing where the closing member arrangement is connected to the drive. Given the presented functionality, the possible applications within the food industry and processing industry are apparent to a person skilled in the art in the field of valve engineering.

The invention claimed is:

1. A valve with a valve housing, the valve comprising:
 a first port and a second port;
 a closing member that is movable along an axial direction and can be brought into a closed position in which the closing member interacts sealingly with a valve seat arranged between the first port and the second port to block a fluid connection between the first port and the second port; and
 a fluid-impermeable diaphragm that comprises a central opening penetrated by a closing member arrangement comprising the closing member and a clamping section in a clamping gap aligned obliquely to the axial direction; wherein:
 the diaphragm is held with a sealing effect on the closing member arrangement and on a valve-housing-side holding arrangement;
 the diaphragm has a first section located on an outer edge, a second section abutting the first section radially to the inside and a third section corresponding to the clamping section abutting the second section radially to the inside;
 the first section is held in a force fit in the holding arrangement;
 the second section is guided in the holding arrangement;

the first section and the second section are arranged at an angle relative to each other;

the holding arrangement is configured such that the first section, the second section and the holding arrangement form a form fit; and the diaphragm has a least one passage between the clamping section and the first section that interacts with a channel formed in the valve-housing-side holding arrangement.

2. The valve according to claim 1, wherein the angle is between 60 degrees and 135 degrees.

3. The valve according to claim 1, wherein the first section is arranged in a plane perpendicular to an axial direction.

4. The valve according to claim 1, wherein the second section is shaped cylindrically with a cylinder axis, and the cylinder axis is oriented in the axial direction.

5. The valve according to claim 1, wherein the holding arrangement has a first gap in which the first section is held in a force fit, and a second gap into which the second section is guided.

6. The valve according to claim 5, wherein the first gap is formed by a first wall and a second wall, and at least one of the first wall or the second wall has a structure that increases friction of the diaphragm in the first gap.

7. The valve according to claim 1, further comprising:
a pressurizing medium-operated drive connected to the closing member arrangement.

8. The valve according to claim 7, further comprising:
a rotary decoupling apparatus arranged in the drive, or between the drive and the closing member arrangement.

9. The valve according to claim 8, wherein the rotary decoupling apparatus is arranged between the drive and the closing member arrangement and comprises a first decoupling member with a cylindrical seat in which a cylindrical projection of a second decoupling member is accommodated.

10. The valve according to claim 1, further comprising:
a first support surface near a side of the valve housing, and a second support surface on the closing member arrangement to support the diaphragm.

11. The valve according to claim 10, wherein, in an open position of the valve, a fluid connection is established between the first port and a second port and, in a closed position of the valve, the diaphragm lies on one of the first support surface or the second support surface, and wherein at least 50% overall of a surface of the diaphragm is supported by at least one of the first support surface or the second support surface in each of the open position and the closed position.

12. The valve according to claim 1, wherein the diaphragm has a compressibility of at least 20% according to ASTM F36.

13. The valve according to claim 1, wherein the clamping gap is formed by a first clamping gap wall and a second clamping gap wall, and at least one of the first clamping gap wall or the second clamping gap wall has a wall structure that increases friction of the diaphragm in the clamping gap.

14. A valve with a valve housing, the valve comprising:
a first port and a second port;
a closing member that is movable along an axial direction and can be brought into a closed position in which the closing member interacts sealingly with a valve seat arranged between the first port and the second port to block a fluid connection between the first port and the second port; and
a fluid-impermeable diaphragm that comprises a central opening penetrated by a closing member arrangement comprising the closing member and a clamping section in a clamping gap aligned obliquely to the axial direction; wherein:
the diaphragm is held with a sealing effect on the closing member arrangement and on a valve-housing-side holding arrangement;
the diaphragm has a first section located on an outer edge, a second section abutting the first section radially to the inside and a third section corresponding to the clamping section abutting the second section radially to the inside;
the first section is held in a force fit in the holding arrangement;
the second section is guided in the holding arrangement;
the first section and the second section are arranged at an angle relative to each other;
the clamping gap is formed by a first clamping gap wall and a second clamping gap wall, and at least one of the first clamping gap wall or the second clamping gap wall has a wall structure that increases friction of the diaphragm in the clamping gap; and
the holding arrangement is configured such that the first section, the second section and the holding arrangement form a form fit.

15. A diaphragm for a valve in the food or processing industry that comprises a valve housing, a closing member arrangement, a valve-housing-side holding arrangement for holding the diaphragm and a clamping gap for clamping the diaphragm running obliquely to an axial direction, and the diaphragm comprising:
a conical section suitable for being accommodated in the clamping gap;
a central opening through which the closing member arrangement can penetrate;
a first section provided on a radial outer edge of the diaphragm against which a second section abuts radially to the inside; wherein the second section is at a preformed angle with respect to the first section and is dimensioned such that the first section and the second section are accommodated in the holding arrangement while forming a form fit;
at least one passage provided in the second section; and
a third section that corresponds to the conical section abutting the second section radially to the inside.

16. The diaphragm according to claim 15, wherein the preformed angle is between 60 degrees and 135 degrees.

17. The diaphragm according to claim 15, wherein the diaphragm has a compressibility of at least 20% according to ASTM F36.

* * * * *